United States Patent [19]

Martin

[11] 3,998,295
[45] Dec. 21, 1976

[54] BRAKE STRUCTURE AND ADJUSTING DEVICE THEREFOR

[76] Inventor: Thomas C. Martin, c/o Wolf Greenfield & Sacks, 185 Devonshire St., Boston, Mass. 02110

[22] Filed: May 21, 1975

[21] Appl. No.: 579,387

Related U.S. Application Data

[60] Division of Ser. No. 419,336, Nov. 27, 1973, Pat. No. 3,899,049, which is a continuation of Ser. No. 233,962, March 13, 1972, abandoned, which is a continuation-in-part of Ser. No. 61,258, Aug. 5, 1970, abandoned, and a continuation-in-part of Ser. No. 849,312, Aug. 12, 1969, abandoned.

[52] U.S. Cl. .............................. 188/71.7; 188/1 A; 188/196 M; 192/70.26; 192/111 R
[51] Int. Cl.² .......................................... F16D 65/38
[58] Field of Search ................ 188/1 A, 71.7, 71.9, 188/196 BA, 196 M; 192/111 A, 111 R, 70.25, 70.26

[56] References Cited

UNITED STATES PATENTS

| | | | |
|---|---|---|---|
| 1,511,776 | 10/1924 | Roberts ..................... | 192/111 R X |
| 2,024,093 | 12/1935 | Crew ........................... | 188/71.7 |
| 2,379,796 | 7/1945 | Freeman et al. ............ | 188/196 BA |
| 2,614,662 | 10/1952 | Hawley ........................... | 188/71.7 |
| 2,888,102 | 5/1959 | Eksergian et al. ............... | 188/71.7 |
| 3,008,546 | 11/1961 | Eksergian ........................ | 188/71.7 |
| 3,010,542 | 11/1961 | Graber ......................... | 188/71.9 X |
| 3,269,490 | 8/1966 | Swift .................................. | 188/71.9 |
| 3,297,115 | 1/1967 | Waloen et al. ............ | 188/196 M X |

FOREIGN PATENTS OR APPLICATIONS

1,252,161  12/1960  France ............................. 188/71.7

*Primary Examiner*—George E. A. Halvosa
*Attorney, Agent, or Firm*—Wolf, Greenfield & Sacks

[57] ABSTRACT

A disc brake construction adapted for use on front or rear wheels of motorcycles and the like. An annular disc having opposed bearing surfaces is supported for rotation within the wheel but on and coaxial with the axle of the wheel. Braking forces are applied through brake shoes that are oppositely aligned on opposite sides of these braking surfaces. The braking shoes are actuated by a hydraulic caliper device that is supported by an annular drum coaxial with the axle. A device is provided for absorbing reaction forces upon braking without transmitting these forces to the fork supporting the axle.

6 Claims, 13 Drawing Figures

BRAKE STRUCTURE AND ADJUSTING DEVICE THEREFOR

CROSS-REFERENCE TO RELATED APPLICATIONS

This application is a division of application Ser. No. 419,336, filed Nov. 27, 1973, now U.S. Pat. No. 3,899,049, which is a continuation of Ser. No. 233,962, filed Mar. 13, 1972, now abandoned, which is a continuation-in-part of Ser. No. 61,258, filed Aug. 5, 1970, and Ser. No. 849,312, filed Aug. 12, 1962, both now abandoned.

BACKGROUND OF THE INVENTION

Although most motorcycles in use today use mechanically operated braking means, several have introduced the use of disc brakes. This development is due in part at least to the increased horsepower and consequent higher average speeds at which motorcycles currently operate. These disc brakes, however, have been used only on the front wheels of the cycles. Moreover, these braking systems use a single disc that is located externally and to one side of the wheel hub. Since the plane of the disc brake surface upon which braking forces are applied in such brakes is substantially closer to one end of the hub than the other, there is a tendency for the wheel to pull toward one side upon appliction of braking forces at speed. This pulling creates a potentially dangerous physical imbalance or lateral instability especially at high speeds. Such arrangements also appear to result in torque and loading imbalances that are absorbed by one of the legs of the motorcycle front fork. This torque imbalance includes a component about an axis normal to the axle of the wheel. The loading imbalance includes side forces generated by piston reaction that are transmitted to the leg of the fork. Such difficulties or limitations may have contributed to the limited use of disc brakes to the front wheels of motorcycles. In addition, the disc brakes heretofore in use are rther bulky and cannot fit readily into the rear wheel area which must also accommodate the drive mechanism.

SUMMARY OF THE INVENTION

It is an object of the present invention to overcome the deficiencies of the prior art referred to above and in my copending application. In the present invention, there is provided a brake structure which is designed for use in either or both of the front and rear wheels of motorcycles and like vehicles. In this arrangement, the disc brake assembly is arranged with a hub supported on an axle housing and including a support member that extends annularly about the axle housing of the wheel. Bearing surfaces are formed on an annular disc integral with the support member. A caliper system having a pair of brake shoes is supported within the hub of the assembly in alignment with the bearing surfaces. The caliper system is supported on a caliper support drum which is coaxial with the axle housing and which provides means for absorbing the side forces effected upon application of the braking force without transmitting these side forces from the drum to the fork of the vehicle.

It is thus an object of the present invention to provide a compact brake structure designed for use with either the front or rear wheels of a motorcycle or like vehicle, but particularly useful for rear wheels of motorcycles. This brake structure is adapted to be incorporated within the hub of the wheel providing a compact, efficient braking system that is protected from contamination by oil, grease and the like. A further object of the present invention is to provide a brake structure within the hub of the wheel in which the side forces resulting from the application of braking forces on the disc are absorbed totally by a caliper support drum that does not transmit these forces to the fork of the cycle.

One further object of the present invention is to provide an improved and balanced brake structure in which braking action is effected by frictional engagement of brake pads and discs simultaneously in a pair of parallel planes spaced closely to and on opposite sides of a central plane passing normally through the wheel axis.

A further object of the present invention is to provide means for adjusting the brake shoe to accommodate for wear on the brake pad. A further object of the present invention is to provide an improved means for retracting the brake shoe from braking engagement after removal of the hydraulically applied forces of braking.

A further object of the present invention is to provide a simple and effective means for adjusting both the primary and secondary brake pads of a caliper system in a floating caliper system.

One further object of the present invention is to provide an improved caliper system of the floating caliper type that includes a positive means for retracting the primary and secondary brake pads to assure proper clearance between discs and pads.

A further object of the present invention is to provide an enclosed disc brake system that protects the operational components of the system from external contamination and damage while at the same time providing effective cooling means and adequate drainage for moisture and condensation within the system.

One more object of the present invention is to provide means for visually indicating the need for brake pad replacement on both the primary and secondary brake shoes.

A further object of the present invention is to provide an improved brake means that includes brake shoes supported on a caliper by guide pins. The guide pins permit parallel displacement of the brake shoes in opposite directions by pistons and return springs and partially absorb brake torque reaction.

One further object of the present invention is to provide a brake system for motorcycles which is adaptable to an arrangement in which braking forces for front and rear wheel brakes may be applied uniformly, simultaneously, and from a single source, thereby providing a faster and safer deceleration. The arrangement also provides a basis for incorporation of a fail-safe, split-braking system, the use of braking ratios and a servo system.

The present invention provides a disc brake system having two pairs of opposing pistons that permit the use of larger brake pads and therefore provide a more effective use of the radial contact area of the disc.

Another object of the present invention is to provide an improved braking system that is simple and inexpensive to maintain and repair.

Another object of the present invention is to provide a braking system which has adequate means for cooling including means for isolating the brake disc from the axle area to minimize heating of the wheel bearings and cooling vents in the hub web for heat dissipation.

Another object of the present invention is to provide tool means for simultaneous adjustments of brake pads for pad wear. One further object is to provide a means for permitting positioning of the disc brake caliper other than in lateral alignment with the fork for design expedience without the need of supplemental supports.

Another object of the present invention is to provide an improved brake system that is adaptable for the front and rear wheels of any conventional motorcycle either as original or replacement equipment. Such equipment may be incorporated with no modifications or replacements of the existing motorcycle components.

DETAILED DESCRIPTION OF THE DRAWINGS

The foregoing objects and advantages of the present invention will be more clearly understood when considered in conjunction with the accompanying drawings, in which.

DETAILED DESCRIPTION OF THE PREFERRED EMBODIMENTS

Figures 1, 2:
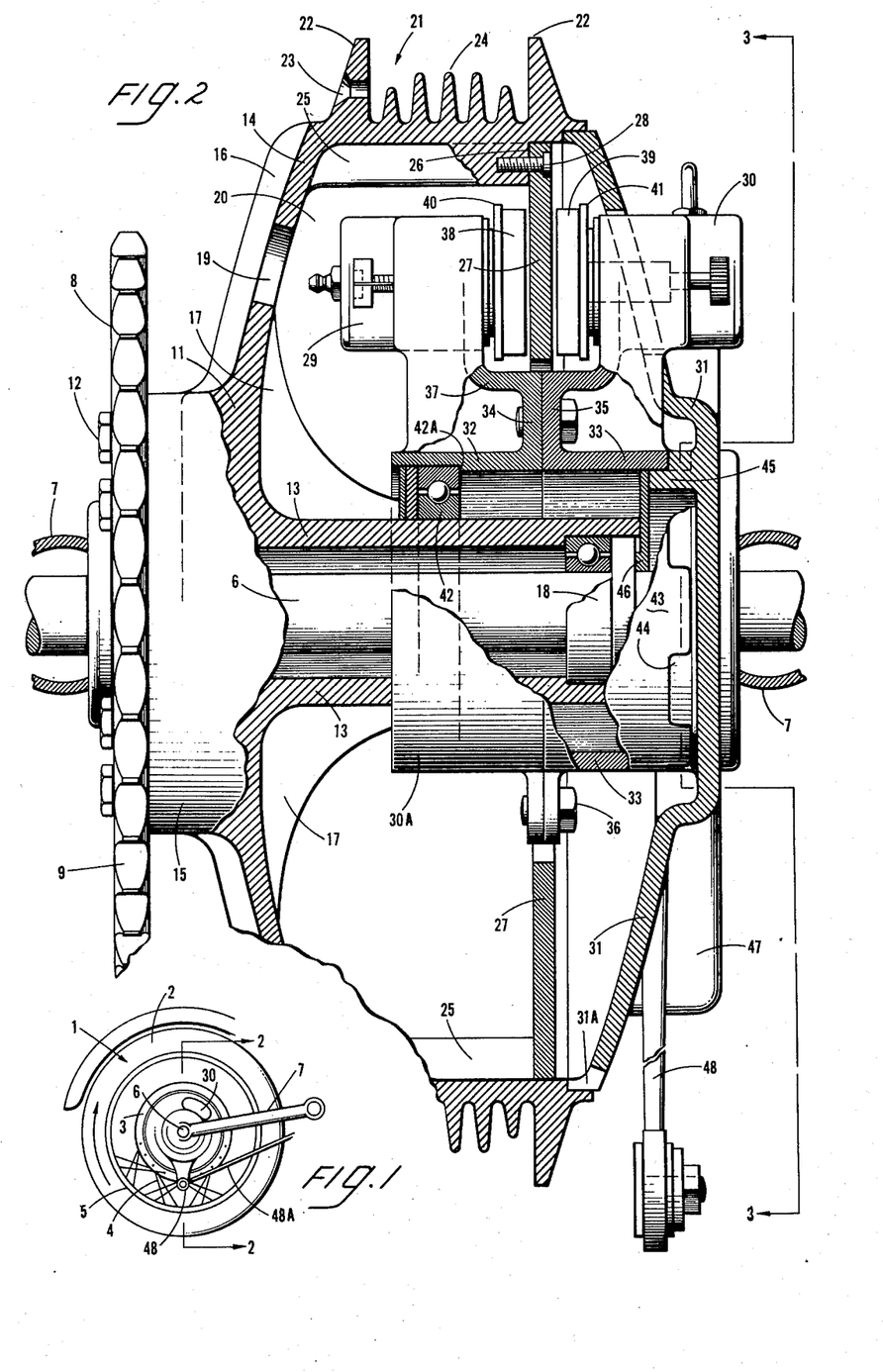
FIG. 1 is a plan elevational view of a preferred embodiment of the invention as incorporated in the rear wheel of a motorcycle.
FIG. 2 is a fragmentary, cross-sectional elevation taken substantially along the line 2—2 of FIG. 1.

Referring to FIG. 1, there is illustrated the rear wheel 1 of the motorcycle. This rear wheel generally comprises a tire 2 that is mounted on the rim 5 of the motorcycle and supported by conventionally arranged spokes 4, that in turn are secured to the wheel hub 3. The wheel 1 is supported on the rear axle 6 which in turn is supported at opposite ends by the parallel legs 7 of the motorcycle swing fork. The axle 6 is secured against rotation by suitable means. Coaxial with the axle 6 is a sprocket 8 around which extends the motorcycle chain 9 that in turn is connected conventionally by means not shown to a drive source.

A support member 11 is rigidly secured to the sprocket 8 by a plurality of bolts 12 that extend through the sprocket 8 and into the support member 11. The support member 11 is provided with an annular core 13 that is coaxial with the axle 6. Integrally formed with the core 13 is a coaxially formed and arcuately flared wall member 14. A projecting boss portion 15 is also integral with the wall member 14 and annular core 13. The bolts 12 extend into the boss portion 15 which is sufficiently massive to provide a sturdy support and means for securing the hub to the sprocket 8. The wall member 14 is formed with a plurality of radially extending ribs 16 that extend outwardly from the boss member 15 and provide added cooling and strength to the wall member 14. In addition, a series of ribs 17 extend between the annular core 13 and the wall member 14 at the juncture of their inner surfaces. Preferably in the order of six to eight ribs 16 and 17 may be provided, depending upon the specific design contemplated.

The annular core 13 is supported and spaced in relation to the axle 6 by means of ball-bearing race assemblies 18 at spaced positions along the axle 6. In FIG. 2, only one of such ball-bearing races is illustrated. A second ball-bearing race is located at the left end of the axle 6 as viewed in FIG. 2. The inner races of the wheel bearings are fixed, the outer races are rotatable. An opening 19 in the wall member 14 is provided for ready access to the interior 20 of the wheel hub for purposes of bleeding the brakes or adjusting the pads for wear.

The crown 21 of the hub is integrally formed with the outer periphery of the wall member 14, and this crown conventionally provides a pair of parallel, annular flanges 22 having a series of holes 23 to which the spokes 4 of the wheel may be attached. Also conventionally provided are a plurality of cooling fins 24. Spaced parallel to one another and parallel to the axle 6 are a series of integrally formed ribs 25 on the inner surface of the crown 21. These ribs provide added support to the hub of the wheel. The ribs terminate at a shoulder portion 26, thus providing a securing and locating means for the annular disc 27. The disc 27 is secured within the interior 20 of the hub by a series of bolts 28 that extend through the disc and into the ribs 25. The disc 27 is thus secured for rotation with the support member 11. Caliper elements 29 and 30 are secured within the periphery of the hub against rotation and symmetrically on opposite faces of the disc 27 by a caliper support drum generally illustrated at 30A. The caliper support drum 30A in turn is fixed between the inner ends of the rotatable ribs 17 and a fixed face plate 31 that is also coaxially mounted on the axle 6. The caliper support drum consists essentially of a pair of annular wall members 32 and 33. Each of these wall members have flanges at adjacent ends that face one another. These annular flanges are rigidly secured together by a series of bolts 36. The flanges 34 and 35 are preferably essentially coplanar with the disc 27. Integrally formed with the flanges 34 and 35 is the yoke assembly 37. This yoke assembly 37 includes bracket elements that support respectively the elements 29 and 30. The yoke 37 provides sufficient clearance for the inner edge of the disc 27 and also provides support for each of the elements 29 and 30 respectively on opposite sides of the disc 27. Conventional brake pads 38 and 39 are supported in facing relation with opposite surfaces of the disc, and are connected to brake shoes 40 and 41 in turn operated by pistons in elements 29 and 30 in a manner consistent with the structure illustrated in my copending application, Ser. No. 61,258 filed Aug. 5, 1970, and entitled BRAKE MEANS.

The annular support members 32 and 33 are supported in spaced relation to the axle 6. The member 32 is supported in spaced relation from the annular core 13 by ball-bearing races 42. The outer race is fixed, the inner race is rotatable. The races 42 are engaged between inner ends of ribs 17 and a shoulder 42A on the inner surface of wall member 32. The annular support member 33 is provided with a splined end 43 that engages an annular flange of face plate 31 which has an outer surface forming a splined portion 44 and secures the caliper support drum 30A against rotation. The drum 30A is thus supported at one end by races 42 and at the other by shoulder 45.

The face plate 31 is provided with a shoulder 45 at its inner periphery that butts a collar 46. The collar 46 is coaxial with the axle 6 and engages the inner surface of the annular support member 33 to prevent its misalignment during assembly of the face plate 31.

The face plate is provided with a pair of cooling manifolds 47 similar to that shown in the previously mentioned copending application. Also provided is a torque take-up 48 and connecting rod 48A of conventional design. The torque take-up 48 precludes the face plate from rotating when the brake is activated.

A weep hole 31A in the face plate 31 provides means for egress of moisture which may have collected by condensation or otherwise within the unit.

Figure 3:
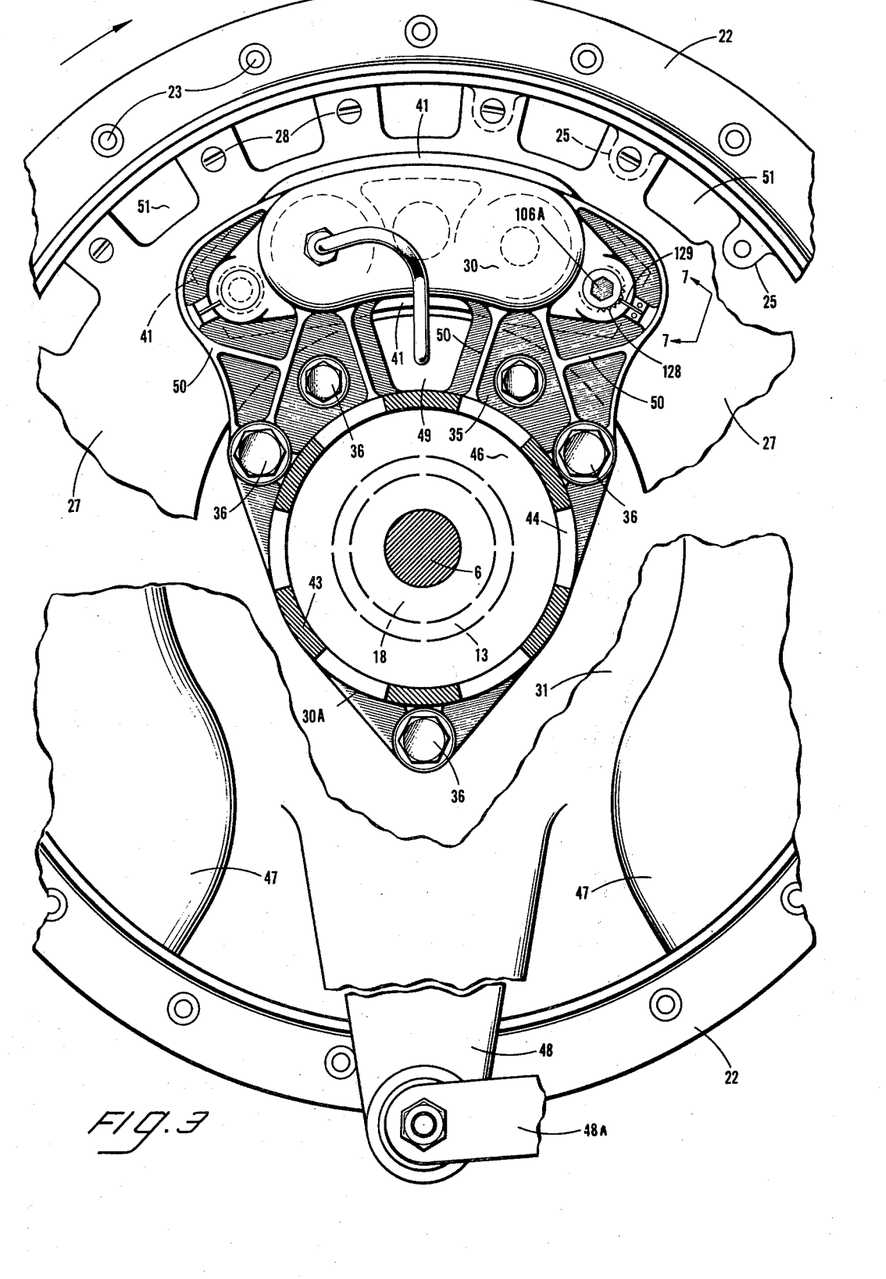
FIG. 3 is a fragmentary, partially broken away elevation taken substantially along the line 3—3 of FIG. 2, with the face plate and collar removed.

As illustrated in FIG. 3, the flanges 35 and flange 34 behind it may be provided with access ports 49 for servicing the element 29 from the right side of the assembly as viewed in FIG. 2. The honeycomb ribbing illustrated in FIG. 3 is provided on the flanges 34 and 35 at 50 for purposes of providing added strength to the caliper support mechanisms. Also, as illustrated in FIG. 3, apertures 51 are provided in the disc 27 at the outer periphery between the portions of the disc that is secured to the ribs 25. These apertures permit the free passage of air for cooling purposes through the interior of the hub.

In the operation of the brake assembly illustrated in FIG. 1, the rotating sprocket 8 normally drives and rotates the support member 11 as the motorcycle is moving. When the brakes are applied, hydraulic fluid is introduced into the elements 29 and 30 simultaneously. These elements are fixed. The elements thus are simultaneously actuated to move the brake shoes and the pads carried by the shoes axially towards one another and into braking engagement with the opposite faces of the disc 27. The forces effected through the brake pads on the opposed faces of the disc are opposite and balanced and are absorbed wholly by the caliper support drum which in turn is fixed on the annular core between the ribs 17 and the face plate 31. The legs 7 of the swing fork thus do not absorb the caliper side loads.

Figures 4, 5:
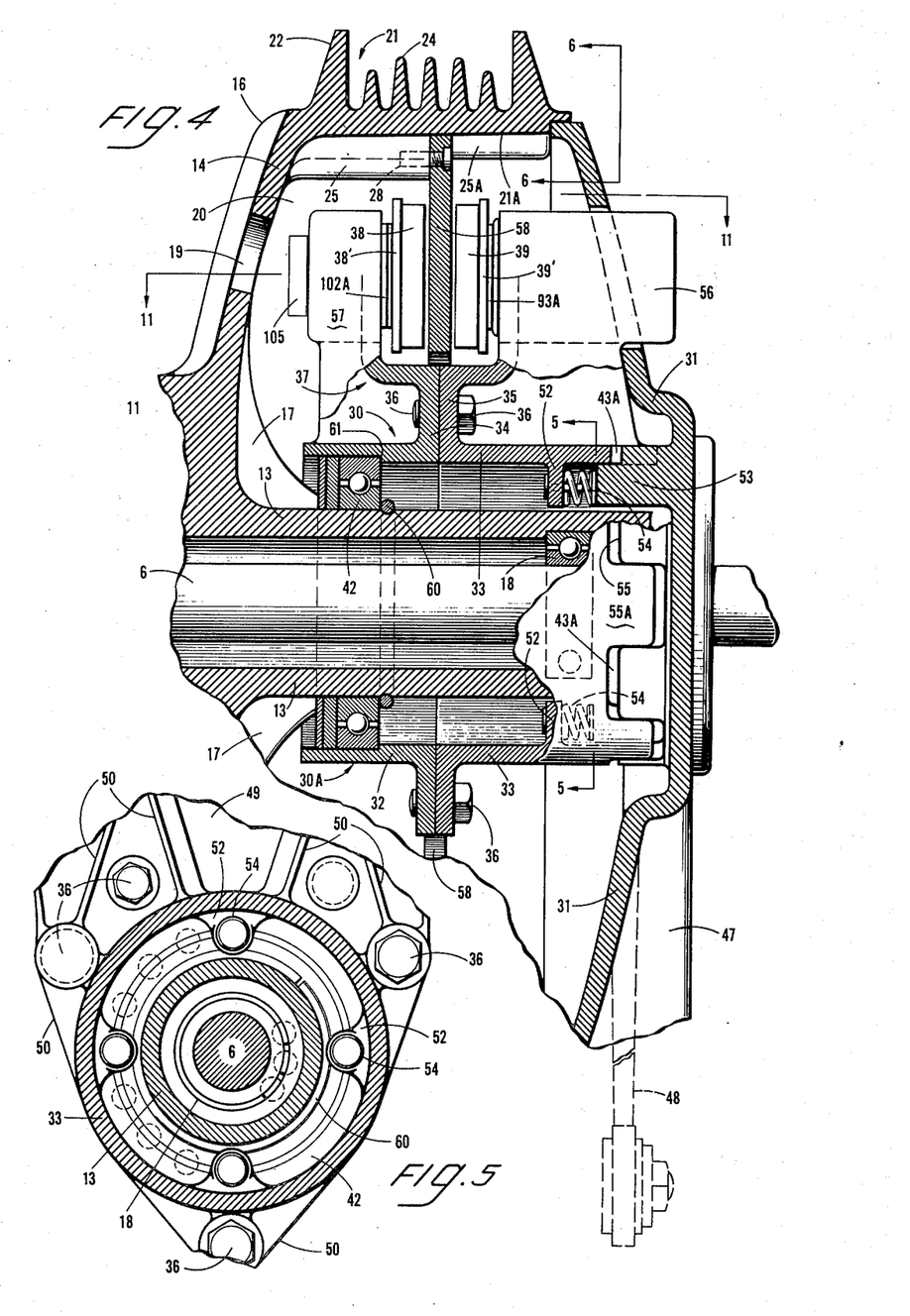
FIG. 4 is a fragmentary, cross-sectional elevation taken substantially along the same line as FIG. 2 but illustrating a modification of the invention.
FIG. 5 is a cross-sectional detail of the embodiment of FIG. 4 taken substantially along the line 5—5 of FIG. 4.
Figure 6:
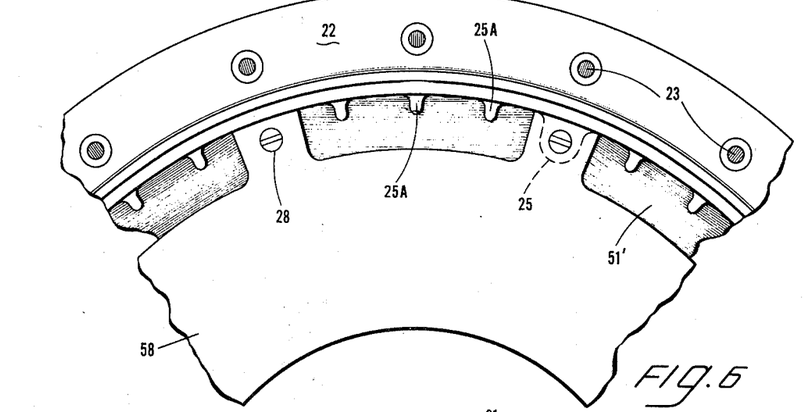
FIG. 6 is a cross-sectional detail of the embodiment shown in FIG. 4 taken along the line 6—6 of FIG. 4.

Turning now to the configuration illustrated in FIG. 4, there is shown a modification of the invention which is simpler in arrangement and which utilizes a symmetrically located disc. In this arrangement, like numbers refer to elements that are essentially the same as those described in connection with FIG. 1. The annular support member 33 is provided with a series, preferably four in number, of bosses 52 that extend inwardly from the inner surface of the annular support member 33. These bosses are spaced from but are near the splined end 55A of the support member 33. The face plate 31 is provided with an annular collar 53 having a surface facing and spaced from bosses 52. A plurality of springs 54 are positioned between the facing surfaces of the collar 53 and the bosses 52. These springs may be held in position by conventional pin means, as illustrated, that are attached to bosses 52.

The springs 54 normally tension the annular members 32 and 33 to the left, as viewed in FIG. 4, and away from the face plate 31. The splined end 55A of the annular support member 33 is provided with a sliding fit arrangement with a corresponding splined end 55 in the annular collar 53 of the face plate 31. The caliper support drum 30A is thus capable of being moved under the influence of the springs 54 in a direction parallel to the axle 6, thus closing or opening the spaces 43A. Supported on the yoke 37 are the caliper elements 56 and 57. In the case of the embodiment of FIG. 4, however, the elements are not symmetrical and only one is powered. In this arrangement, the caliper arrangement is a sliding caliper configuration in which the primary power provided in elements 56 and 57 is a slave or secondary, non-powered element. Element 56 includes a piston 93A which engages brake shoe 39' while element 57 includes a threaded shaft that engages brake shoe 38'. The primary element 56 and the secondary element 57 are supported in a manner similar to that described in connection with FIG. 1. In this arrangement, however, the disc 58 is symmetrically located with respect to the interior 20 of the hub. In order to attain this, the ribs 25 on the inner surface 21A of the crown are shorter. Supplemental ribs 25A are provided on the opposite side of the disc 58. This arrangement may be attained by providing cut-out segments in the disc 58 through which the ribs 25A may slide during the assembly of the disc 58, and its attachment to the ribs 25. The caliper support drum 30A is normally located in a position such that the brake pads 38 and 39 are symmetrical with respect to the disc 58. This is attained by securing the bearing races 42 in a shoulder 61 at one end of the drum 30A against the tension of spring 54. The snap ring 60 supported in the groove that is annularly formed in the outer surface of the core 13 holds races 42 in place when the drum moves to the right as viewed in FIG. 4. Movement towards the right is normally resisted by action of the springs 55 until there is a positive displacement occasioned by the application of the braking forces. Upon the application of braking power, the brake pad 39 is moved by primary power source, namely, element 56, into engagement with disc 58. The resultant normal reaction causes the caliper to move axially in the opposite direction bringing the secondary pad 38 into contact with the other side of disc 58. When the pad loads are equal, axial movement of the caliper ceases.

Referring now to the embodiment illustrated in FIGS. 9 and 10, once again similar numbers refer to corresponding elements to the components previously described. The support member 62 comprises an annular core 63 that is coaxial with the axle 6. Extending symmetrically from the core in a radial direction is the web 64. This web 64 is integral with the crown 65. The crown 65 is flared outwardly and symmetrically from the free end of the web 64 and is formed with flanges and cooling fins substantially similar to those previously described. In this modification, however, there is provided a series of radially extending vents that are drilled or otherwise formed in the surface of the crown towards the annular core 63 within and parallel to the sidewalls of the web 64. These vents, which may vary in depth and in width as well as thickness, are designed to provide a cooling surface for cooling the web which carries and is in thermal contact with the bearing surfaces. The inner surface 21A of crown 65 is tapered to permit water to run out through weep holes (not shown). The bearing surfaces 67 and 68 are annular members that are suitably secured in annular grooves on opposite surfaces of the web 65. Since the web is preferably formed of aluminum and the bearing surface is of conventional material, more effective cooling is possible. These bearing surfaces 67 and 68 are coaxial with the axle 6. The annular core 63 is supported for rotation relative to the axle 6 by wheel ball-bearing races 69 and 70. Conventional grease retainers or end caps 71 are provided on opposite sides of the ball-bearing races 69 and 70. Aligned with the bearing surfaces 67 and 68 are the caliper elements 72 and 73. These elements include hydraulically actuated pistons 72A and 73A which operate respectively the brake shoes 74 and 75. Attached to these brake shoes 74 and 75 are the brake pads 76 and 77 respectively. Actuation of the elements simultaneously will thus cause movement of the brake pads into frictional braking engagement with the bearing surfaces 66 and 68. The elements 72 and 73 are each supported on caliper support members 78 and 79 respectively. The caliper support members 78 and 79 include means suitably shaped and formed to engage and secure the caliper within the hub of the wheel. This means includes as an integral part of the assembly the face plates 80 and 81. These face plates are supported on the axle 6 against rotation. The face plates may be secured for example directly to the legs of fork 82A, as illustrated by members 82 and 83. These members are intended to and preclude rotation of the face plates and caliper. The face plates 80 and 81 are provided with a core portion 84 and 85 that is coaxial with the annular core 63 and cooling manifolds 80A and 81A respectively. The core portions are supported in spaced relation with the annular core 63 by ball-bearing races 86 and 87, or by other suitable means, such as bushings. Bearing grease retainers 86A and 87A cover the inner sides of the races 86 and 87 respectively, and prevent possible grease leakage and keep dust and dirt from entering the bearings. Integrally formed with the core portions 84 and 85 are webs 88 and 89 that extend radially outwardly into engagement with the calipers 72 and 73. End caps 90 and 91 provide a bearing surface. These caps are sandwiched between the face plates and the fork legs (not shown). Nuts are threaded onto the ends of the axle 6 on the outer sides of the fork legs (not shown).

Figures 9, 10:
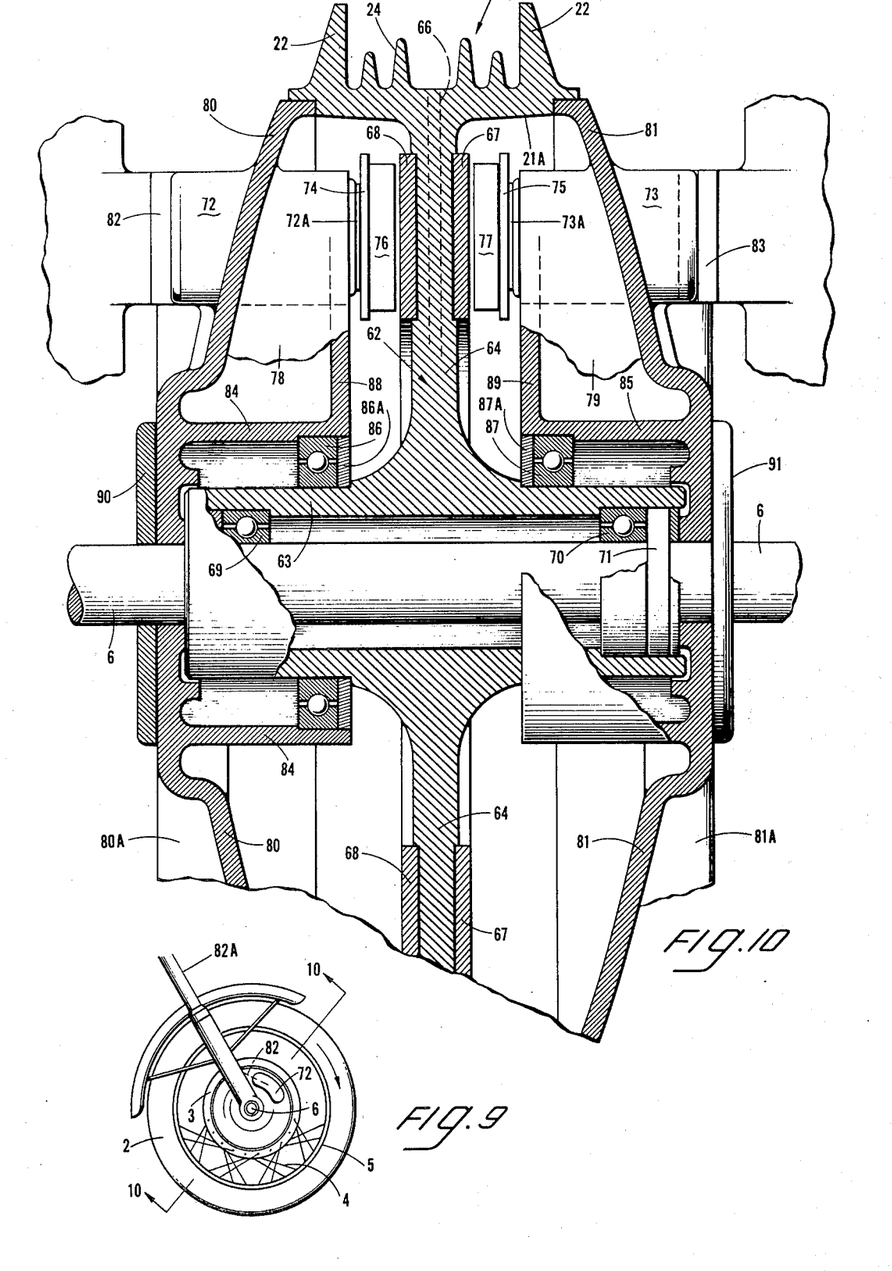
FIG. 9 is a plan, elevational view of a further modification of the invention as embodied in the front wheel of a motorcycle.
FIG. 10 is a cross-sectional, fragmentary view of the embodiment of FIG. 9 taken substantially along the line 10—10 of FIG. 9.

In the operation of this arrangement, the support member 62 rotates with the front wheel while the elements 72, 73 and the related supporting elements including the caliper support members 78 and 79 remain stationary. Upon the application of a braking force, fluid is introduced into the calipers to exert pressure on the piston, thus forcing the braking pad 76 and 77 into frictional braking engagement with the bearing surfaces 67 and 68. The forces effected by this frictional interengagement are absorbed by the caliper drum.

Figure 11:
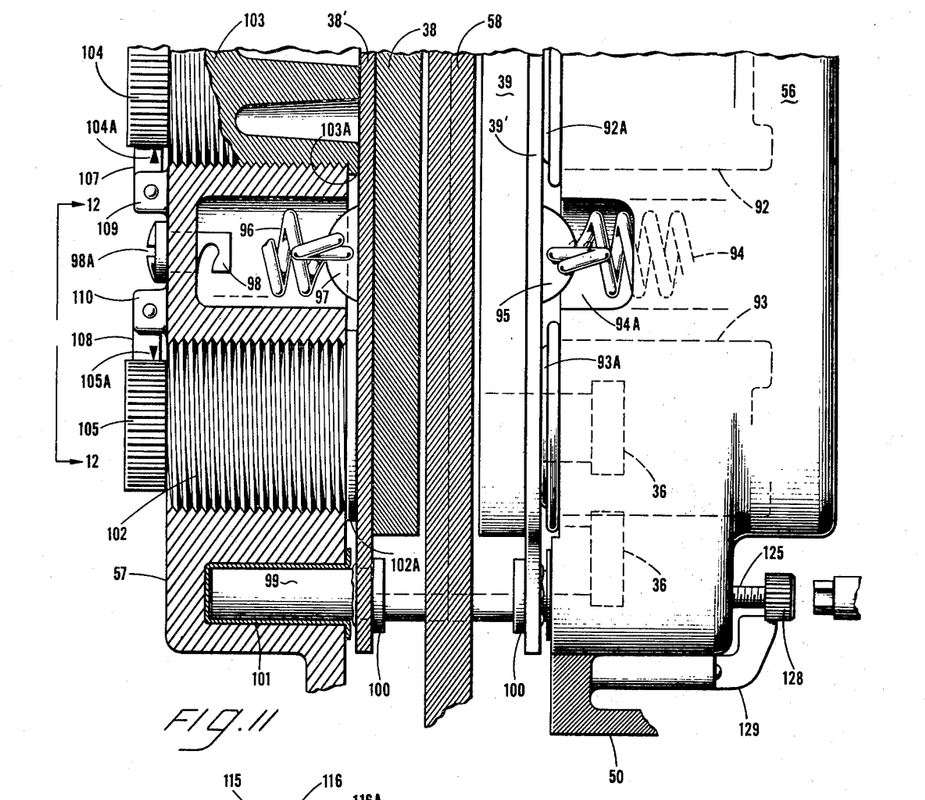
FIG. 11 is a cross-sectional detail taken along the line 11—11 of FIG. 4.
Figure 12:
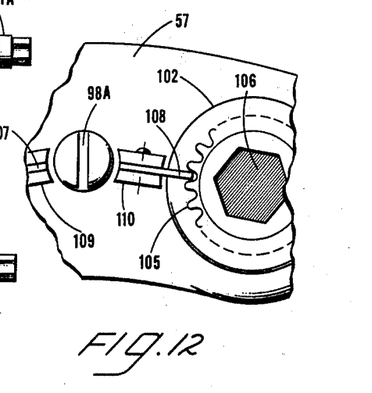
FIG. 12 is fragmentary detail taken along the line 12—12 of FIG. 11.

Referring to the modification of details illustrated in FIGS. 11 and 12, there is shown the details of a floating or caliper brake. The embodiment illustrated may be used in any floating or sliding caliper arrangement of the type herein described. FIG. 11, however, illustrates a specific embodiment in detail of the floating piston caliper configuration, as shown in FIG. 4, detailing the brake wear adjustment means.

In this arrangement, the disc 58 is provided with bearing surfaces that are frictionally engaged by the brake pads 38 and 39. These pads are in turn supported as previously indicated by brake shoes 38' and 39' respectively. The brake shoe 39' is moved laterally by the pistons 92A, 93A contained within the hydraulic cylinders and outlined at 92 and 93. The brake shoe 39' is normally tensioned to a retracted position by a spring 94 within recess 94A. The spring 94 has one end that engages a hook on the wall of the caliper (not shown) and the other engaging a bracket 95 that is integrally formed with the brake shoe 39'.

The brake shoe 38' on the secondary or slave element is similarly tensioned in a retracted position by the spring 96 that has one end secured to the bracket 97 and the other end secured to the hook 98 by head 98A. The brake shoes 38' and 39' are supported relative to the secondary element 57 by a pair of guide pins 99 at opposite ends. The guide pins are secured by heads 100 at one end to the brake shoe 38'. The other end of the guide pins extends into a sleeve 101 that in turn is secured within an opening in the secondary element 57.

Lateral adjustment of the secondary brake shoe 38' for pad wear may be effected by adjusting the pair of threaded shafts 102 and 103. These threaded shafts 102 and 103 are dimensionally substantially identical to and are aligned with the cylinders in the primary element 56. The threaded shafts 102 and 103 are threaded through the secondary element 57. Flanges 102A and 103A of one end of each of these shafts 102 and 103 bear on and engage a surface of the brake shoe 38' opposite the surface that engages the brake pad 38. The other end of these shafts 102 and 103 have a knob or head 104 and 105 that is slotted or geared. These heads 104 and 105 are also formed with recessed hexagonal holes 106, as illustrated in FIG. 12. Springs 107 and 103 are symmetrically supported on the caliper element by bosses 109 and 110 respectively. These bosses are integrally formed with the caliper element 57 and secure one end each of the springs 107 and 108. The other end of each of the springs 107 and 108 engage respectively the heads 104 and 105. These springs thus secure the posts 102 and 103 against inadvertent loosening. Markers 104A and 105A on the springs 107 and 108 respectively indicate a point at which the brake pads must be replaced. This occurs when the outer face of the heads 104 and 105 reaches the markers 104A and 105A respectively.

Adjustments to the secondary element for taking up wear on the brake pad 38 requires simultaneous tightening of the posts 102 and 103 to precisely equal amounts. In order to effect this equal tightening of the posts 102 and 103, a tool as illustrated in FIG. 13 is provided.

Figure 13:
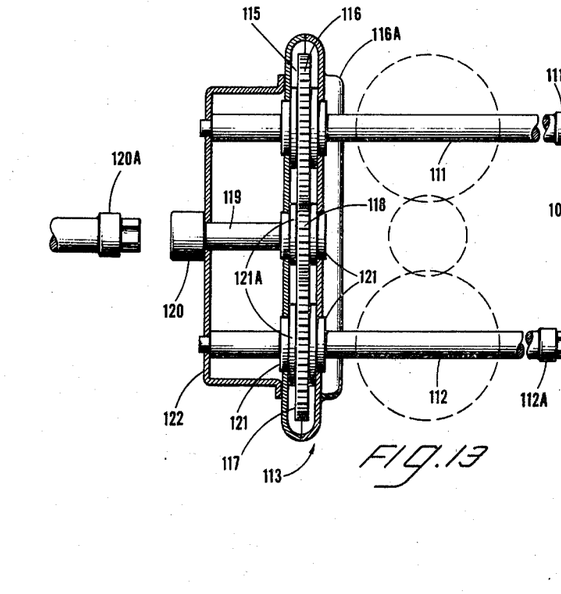
FIG. 13 is a partial, cross-sectional elevation of a tool necessary to adjust the threaded shafts to compensate for brake pad wear and to provide proper clearance between pads and disc.

The tool illustrated in FIG. 13 is provided with two shafts 111 and 112 that extend parallel to one another. The shafts are spaced apart so that the holes 106 of the heads 104 and 105 may be simultaneously engaged by hexagonal ends 111A and 112A. The other end of the shafts 111 and 112 are supported in the bracket 113 having reinforced ribs 116A. This bracket 113 also supports a gear train 115. The gears are spaced from the bracket 113 by spacers 121A on shafts, with shaft 119 secured at one end by washer 121. The gear train 115 includes gears 116 and 117 that are engaged by central gear 118, and is keyed to and controlled for rotation by shaft 119. Shaft 119 in turn is supported in support element 122. A hexagonal opening in knob 120 is part of shaft 119. Suitable bearings 121 are provided on the shafts 111, 112 and 119 for rotation of the various elements described. In the operation of this tool, the operator will turn the knob 120 with a ratchet and this in turn causes rotation of the shafts 111 and 112 in the same direction, thus causing simultaneous rotation of the threaded shafts 102 and 103 in member 57. A similar tool with wider-spaced shafts 111, 112 may also be used in connection with adjustments of the primary caliper 56 in a similar fashion.

Figure 7:
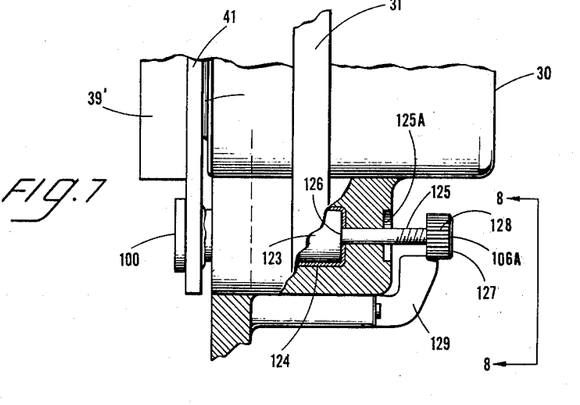
FIG. 7 is a cross-sectional detail taken essentially along the line 7—7 of FIG. 3.
Figure 8:
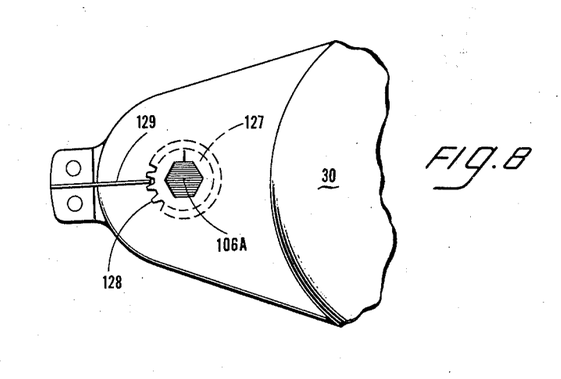
FIG. 8 is a fragmentary, elevational view taken along the line 8—8 of FIG. 7.

Turning now to the detail illustrated in FIGS. 7 and 8, there is shown a means for adjustment of pad wear of brake shoe 41. In this arrangement, the guide pins 123 that support the shoe 41 extend into a sleeve 124 within the caliper element 30. A threaded shaft 125 extends into the element 30 and has one end 126 that engages the inner end of the guide pin 123. Thus, by rotating the shaft 125 through the knob handle 127, an adjustable stop may be provided for the guide pin 123. The head 127 is provided with a series of notches or teeth 128 that are engageable by the spring 129. The leaf spring 129 in turn is anchored or suitably secured to the caliper. This spring thus provides a stop mechanism to prevent inadvertent turning of the shaft 125. Similar arrangements are provided at opposite ends of the caliper so that simultaneous adjustments may be made to precise amounts at each end.

Referring once again to the embodiment illustrated at FIG. 4, there is shown a torque take-up arm 48' in dotted outline. The torque take-up arm 48' would be used if this wheel were incorporated into the rear wheel of a motorcycle. The torque take-up arm would not be used if the wheel were used as the front wheel of a motorcycle. In that case, the torque that prevents rotation of the face plate can be taken up by locking or otherwise engaging the caliper or face plate to the front fork in a manner that is generally illustrated in FIGS. 9 and 10.

Although the system describes a hydraulically operated caliper arrangement, there are no illustrations of the means by which hydraulic fluid is delivered to and taken from the caliper pistons, as conventional means well known in the art may be used for this purpose.

I claim:

1. Adjustable disc brake apparatus supported on a caliper housing comprising:
    at least one brake shoe and associated brake pad,
    at least one guide pin secured to and supporting said brake shoe at opposite ends parallel to said disc and for movement toward said disc,
    said guide pins slideably engaged within sleeves in said caliper housing, means for adjustably limiting the non-actuated distance between said brake shoe and disc comprising a threaded shaft associated with each said guide pin, and means supporting said threaded shafts in said caliper housing with one end engageable with the end of said associated guide pin remote from said brake shoe and the other end of said shaft external of said housing.

2. The apparatus of claim 1 including biasing means for maintaining said brake shoe normally withdrawn from said disc.

3. The apparatus of claim 2 including stop means for maintaining said adjusting means in a pre-selected position against inadvertent movement.

4. The apparatus of claim 3 wherein said stop means includes a leaf spring and means forming a plurality of stops radially arranged about said threaded shaft and adapted to be successively engaged by said leaf spring.

5. The apparatus of claim 1 having a pair of brake shoes and associated pads disposed on opposite sides of said disc and within said caliper housing, and supporting means for the second brake shoe which supporting means for the second brake shoe are fixed relative to said disc.

6. The apparatus of claim 5 wherein one of said pair of brake shoes comprises a slave unit, said guide pins in said slave unit comprising threaded shafts extending through said caliper housing and said slave unit having a stop means for limiting movement of said adjusting means, said stop means including a leaf spring engageable with each of said shafts, said leaf spring having indicia thereon for indicating when said slave unit brake pad is excessively worn.

* * * * *